(12) United States Patent
Dicker et al.

(10) Patent No.: US 6,259,722 B1
(45) Date of Patent: Jul. 10, 2001

(54) METHOD AND SYSTEM FOR TABLE IMPLEMENTED FREQUENCY SELECTION IN A FREQUENCY HOPPING CORDLESS TELEPHONE SYSTEM

(75) Inventors: Olaf Dicker, Austin; Paulus Sastrodjojo, Round Rock; Uwe Sydon; Juergen Kochmann, both of Austin, all of TX (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/113,539

(22) Filed: Jul. 10, 1998

(51) Int. Cl.[7] .................................................. H04B 1/713
(52) U.S. Cl. ............................................ 375/132; 375/133
(58) Field of Search ..................................... 375/132, 133, 375/134, 135, 136, 137

(56) References Cited

U.S. PATENT DOCUMENTS

| | | | |
|---|---|---|---|
| 6,091,758 | * | 7/2000 | Ciccone et al. ........................ 375/132 |
| 6,111,909 | * | 8/2000 | Taki ...................................... 375/132 |
| 6,151,352 | * | 11/2000 | Taki et al. ............................. 375/132 |

FOREIGN PATENT DOCUMENTS 10-210552    7/1998   (JP) .

OTHER PUBLICATIONS

Siemens publication by Vedat Bilgutay and David Leach entitled *A Dissertation on Mobiity Markets and In–Building Wireless Telephone Requirements*, located on the Internet at http://www.siemenscom.com/products/wpapers/mobility.htm.

Siemens publication entitled *Siemens Reports Solid Growth*, located on the Internet at http://www.siemenscom.com/news/pr/960315b.htm.

Siemends AG PN Applications/Solutions Cordless Systems located on the Internet at http://w3.siemens.de/pn/an/cordless/clfunk.htm.

DECT by Ericsson located on the Internet at http://www.ericsson.com/BN/dect9.html.

* cited by examiner

*Primary Examiner*—Don N. Vo

(57) ABSTRACT

A method and system for table implemented frequency selection in a frequency hopping cordless telephone system is provided. A first table comprising an array of sequence numbers is maintained. A second table comprising an array of channel numbers is also maintained. A sequence number is selected from the first table by using a table arrangement number and a subset counter. A channel number is selected from the second table using the sequence number and an index counter. A selected frequency is derived from the channel number and the subset counter.

52 Claims, 5 Drawing Sheets

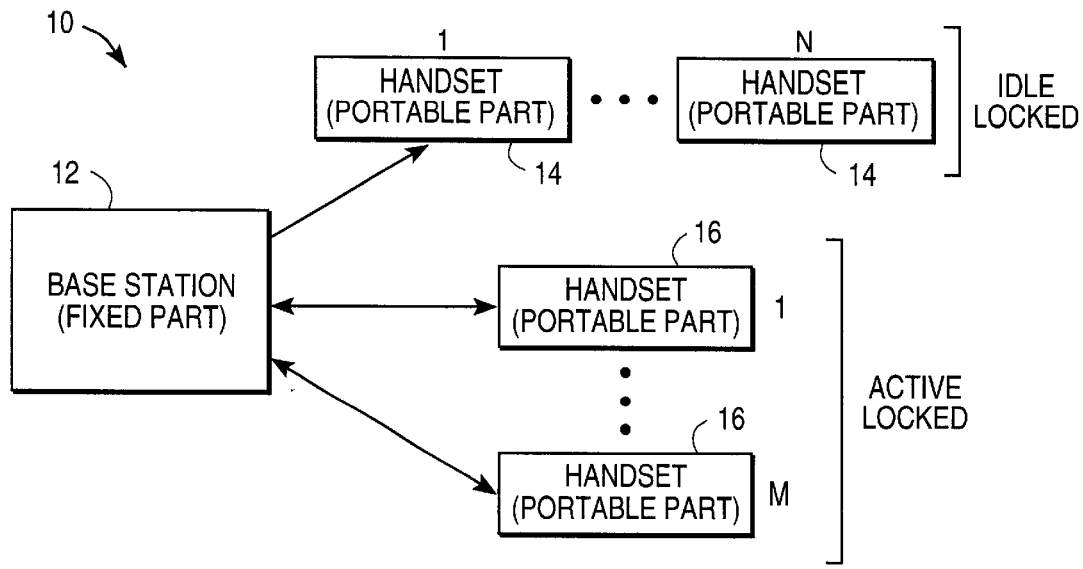
FIG. 1
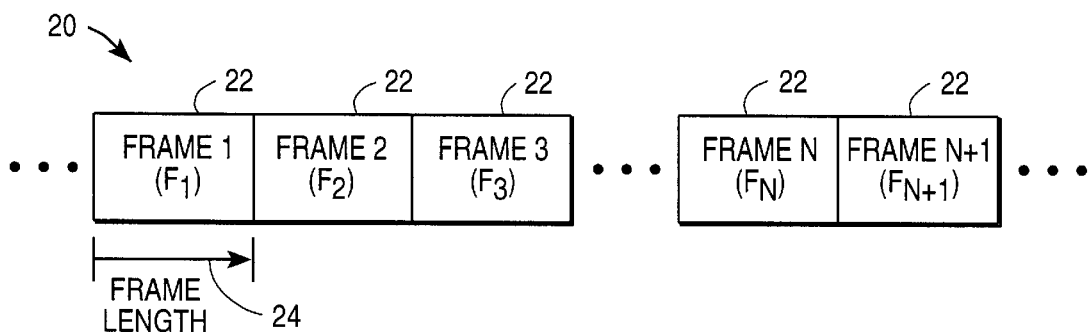
FIG. 2
| SUBSET | 0 | 1 | 2 | 3 | 4 | 5 | 6 | 7 | 8 | 9 | 10 | 11 | 30 |
|---|---|---|---|---|---|---|---|---|---|---|---|---|---|
| CHANNEL | 0...7 | 0...7 | 0...7 | 0...7 | 0...7 | 0...7 | 0...7 | 0...7 | 0...7 | 0...7 | 0...7 | 0...7 | 32 |
| FREQUENCY | 0...7 | 8...15 | 16... | | | | | | | | | ...95 | 34 |
2.4 GHz — 2.4835 GHz
FIG. 3

| Table Arrangement Number \ Subset | 0 | 1 | 2 | 3 | 4 | 5 | 6 | 7 | 8 | 9 | 10 | 11 |
|---|---|---|---|---|---|---|---|---|---|---|---|---|
| 1 | 1 | 2 | 3 | 4 | 5 | 6 | 7 | 8 | 9 | 10 | 11 | 12 |
| 2 | 2 | 3 | 4 | 5 | 6 | 7 | 8 | 9 | 10 | 11 | 12 | 1 |
| 3 | 3 | 4 | 5 | 6 | 7 | 8 | 9 | 10 | 11 | 12 | 1 | 2 |
| 4 | 4 | 5 | 6 | 7 | 8 | 9 | 10 | 11 | 12 | 1 | 2 | 3 |
| 5 | 5 | 6 | 7 | 8 | 9 | 10 | 11 | 12 | 1 | 2 | 3 | 4 |
| 6 | 6 | 7 | 8 | 9 | 10 | 11 | 12 | 1 | 2 | 3 | 4 | 5 |
| 7 | 7 | 8 | 9 | 10 | 11 | 12 | 1 | 2 | 3 | 4 | 5 | 6 |
| 8 | 8 | 9 | 10 | 11 | 12 | 1 | 2 | 3 | 4 | 5 | 6 | 7 |
| 9 | 9 | 10 | 11 | 12 | 1 | 2 | 3 | 4 | 5 | 6 | 7 | 8 |
| 10 | 10 | 11 | 12 | 1 | 2 | 3 | 4 | 5 | 6 | 7 | 8 | 9 |
| 11 | 11 | 12 | 1 | 2 | 3 | 4 | 5 | 6 | 7 | 8 | 9 | 10 |
| 12 | 12 | 1 | 2 | 3 | 4 | 5 | 6 | 7 | 8 | 9 | 10 | 11 |
| 13 | 12 | 11 | 10 | 9 | 8 | 7 | 6 | 5 | 4 | 3 | 2 | 1 |
| 14 | 11 | 10 | 9 | 8 | 7 | 6 | 5 | 4 | 3 | 2 | 1 | 12 |
| 15 | 10 | 9 | 8 | 7 | 6 | 5 | 4 | 3 | 2 | 1 | 12 | 11 |
| 16 | 9 | 8 | 7 | 6 | 5 | 4 | 3 | 2 | 1 | 12 | 11 | 10 |

FIG. 6

| Sequence Number \ Index Number | 0 | 1 | 2 | 3 | 4 | 5 | 6 | 7 |
|---|---|---|---|---|---|---|---|---|
| 1 | Ch0 | Ch1 | Ch2 | Ch3 | Ch4 | Ch5 | Ch6 | Ch7 |
| 2 | Ch2 | Ch3 | Ch0 | Ch1 | Ch6 | Ch7 | Ch4 | Ch5 |
| 3 | Ch4 | Ch5 | Ch0 | Ch1 | Ch2 | Ch3 | Ch6 | Ch7 |
| 4 | Ch2 | Ch3 | Ch6 | Ch7 | Ch0 | Ch1 | Ch4 | Ch5 |
| 5 | Ch0 | Ch1 | Ch4 | Ch5 | Ch6 | Ch7 | Ch2 | Ch3 |
| 6 | Ch4 | Ch5 | Ch2 | Ch3 | Ch6 | Ch7 | Ch0 | Ch1 |
| 7 | Ch3 | Ch2 | Ch5 | Ch4 | Ch1 | Ch0 | Ch7 | Ch6 |
| 8 | CH7 | CH6 | CH3 | CH2 | CH1 | CH0 | CH5 | CH4 |
| 9 | Ch5 | Ch4 | Ch1 | Ch0 | Ch7 | Ch6 | Ch3 | Ch2 |
| 10 | Ch3 | Ch2 | Ch7 | Ch6 | Ch5 | Ch4 | Ch1 | Ch0 |
| 11 | Ch5 | Ch4 | Ch7 | Ch6 | Ch1 | Ch0 | Ch3 | Ch2 |
| 12 | Ch7 | Ch6 | Ch5 | Ch4 | Ch3 | Ch2 | Ch1 | Ch0 |

FIG. 7

METHOD AND SYSTEM FOR TABLE IMPLEMENTED FREQUENCY SELECTION IN A FREQUENCY HOPPING CORDLESS TELEPHONE SYSTEM

CROSS REFERENCE TO RELATED APPLICATIONS

This application is related to U.S. patent application Ser. No. 09/113,396, entitled "Method and System for Avoiding Bad Frequency Subsets in a Frequency Hopping Cordless Telephone System", pending; and U.S. patent application Ser. No. 09/113,415, entitled "Method and System for Shifting Frequency Subsets to Avoid Base Station Interference in a Frequency Hopping Cordless Telephone System", pending, the disclosures of which are incorporated herein by reference.

TECHNICAL FIELD OF THE INVENTION

The present invention relates in general to the field of cordless communication systems and, more particularly, to a method and system for table implemented frequency selection in a frequency hopping cordless telephone system.

BACKGROUND OF THE INVENTION

Cordless or wireless communications systems are widely used to provide users with mobile communications. In general, the term cordless can refer to any form of air wave transmission using a set of radio frequencies. Conventional implementations of cordless systems, for example, include both public cordless systems and inbuilding cordless systems. In public systems, there are numerous service providers that allow users to make and receive calls virtually anywhere within a service area. Such service providers offer solutions based on a number of different technologies and standards. Typically, the service providers have purchased a license from the federal government (i.e., Federal Communications Commission) to use a specific portion of the radio spectrum within specific markets.

In contrast to public systems, in-building cordless systems can avoid the costs of radio spectrum licenses by using unlicensed radio frequencies. In-building systems typically have a common configuration or topography in that there is a radio exchange that is adjunct to or integrated with a private branch exchange (PBX). Base stations (or fixed parts) are equipped with radio antennas that connect to the radio exchange. The base stations also transmit radio signals to and receive radio signals from cordless handsets (portable parts) within a limited range.

With respect to unlicensed radio frequencies, cordless systems often use the ISM (Industrial, Scientific and Medical) band. In the United States, ISM based devices are regulated by and must follow Federal Communications Commission (FCC) guidelines. In general, FCC guidelines implement restrictions on the use of frequencies within the ISM band. For example, devices are allowed to communicate at a particular frequency only with a defined bandwidth for a defined period of time and with a defined signal power level. Since the ISM band is unlicensed, it is used by many vendors for various types of cordless devices (e.g., medical monitoring devices, wireless LANs, printers, speakers, security systems and in-building cordless systems). Consequently, radio frequency (RF) interference can be a significant problem with using the ISM band.

For a cordless telephone system using the ISM band, the FCC restrictions produce a need to implement a frequency hopping scheme to ensure that the cordless system does not violate restrictions on the use of frequencies within the ISM band. Frequency hopping can achieve this by allowing base stations and handsets to move in sync from frequency to frequency in the time domain. Further, when implementing such a frequency hopping scheme, there is a need to implement a scheme for avoiding bad channels or frequencies due to RF interference and other problems.

Such frequency hopping can be problematic, however. For example, if the base station and the cordless handset are not synchronized, they will not hop together and thus transmissions will not be successful. Additionally, if an in-building cordless system includes more than one base station, the two base stations can interfere with each other if they hop to the same frequencies during the same time period. Additionally, it can be difficult to modify the hop sequences.

SUMMARY OF THE INVENTION

In accordance with the present invention, a method and system for table implemented frequency selection in a frequency hopping cordless telephone system are disclosed that provide significant advantages over prior developed frequency selection methods and systems.

According to one aspect of the present invention, the method includes maintaining a first table comprising an array of sequence numbers and a second table comprising an array of channel numbers. The method further includes selecting a sequence number from the first table by using the table arrangement number and a subset counter. Next, a channel number is selected from the second table using the sequence number and an index counter. A selected frequency is derived from the channel number and the subset counter.

In one embodiment, the first table comprises a two dimensional array of sequence numbers, indexed on a first axis by a range of table arrangement numbers and on a second axis by a range of subset numbers. In another embodiment, the second table comprises a two dimensional array of channel numbers, indexed on a first axis by a range of sequence numbers and on a second axis by a range of index numbers.

It is a technical advantage of the present invention that operating frequencies can be selected that reduce the possibility of interference between handsets in a digital cordless telephone system. It is another technical advantage that the interference between multiple base stations can be reduced.

It is a further technical advantage of the present invention that the air interference capacity in a digital cordless telephone system can be optimized by implementing different tables.

Other technical advantages should be apparent to one of ordinary skill in the art in view of the specification, claims and drawings.

BRIEF DESCRIPTION OF THE DRAWINGS

A more complete understanding of the present invention and advantages thereof may be acquired by referring to the following description taken in conjunction wit the accompanying drawings, in which like reference numbers indicate like features, and wherein:

FIG. 1 is a block diagram of one embodiment of a frequency hopping cordless telephone system;

FIG. 2 is a block diagram of one embodiment of frame frequencies for a frequency hopping cordless telephone system.

FIG. 3 is a diagram of one embodiment of subdividing the ISM band for a frequency hopping cordless telephone system;

FIG. 6 is a diagram of one embodiment of a sequence table used by a method for table implemented frequency selection in a frequency hopping cordless telephone system; and FIG. 7 is a diagram of one embodiment of a channel table used by a method for table implemented frequency selection in a frequency hopping cordless telephone system.

DETAILED DESCRIPTION OF THE INVENTION

Figure 4:
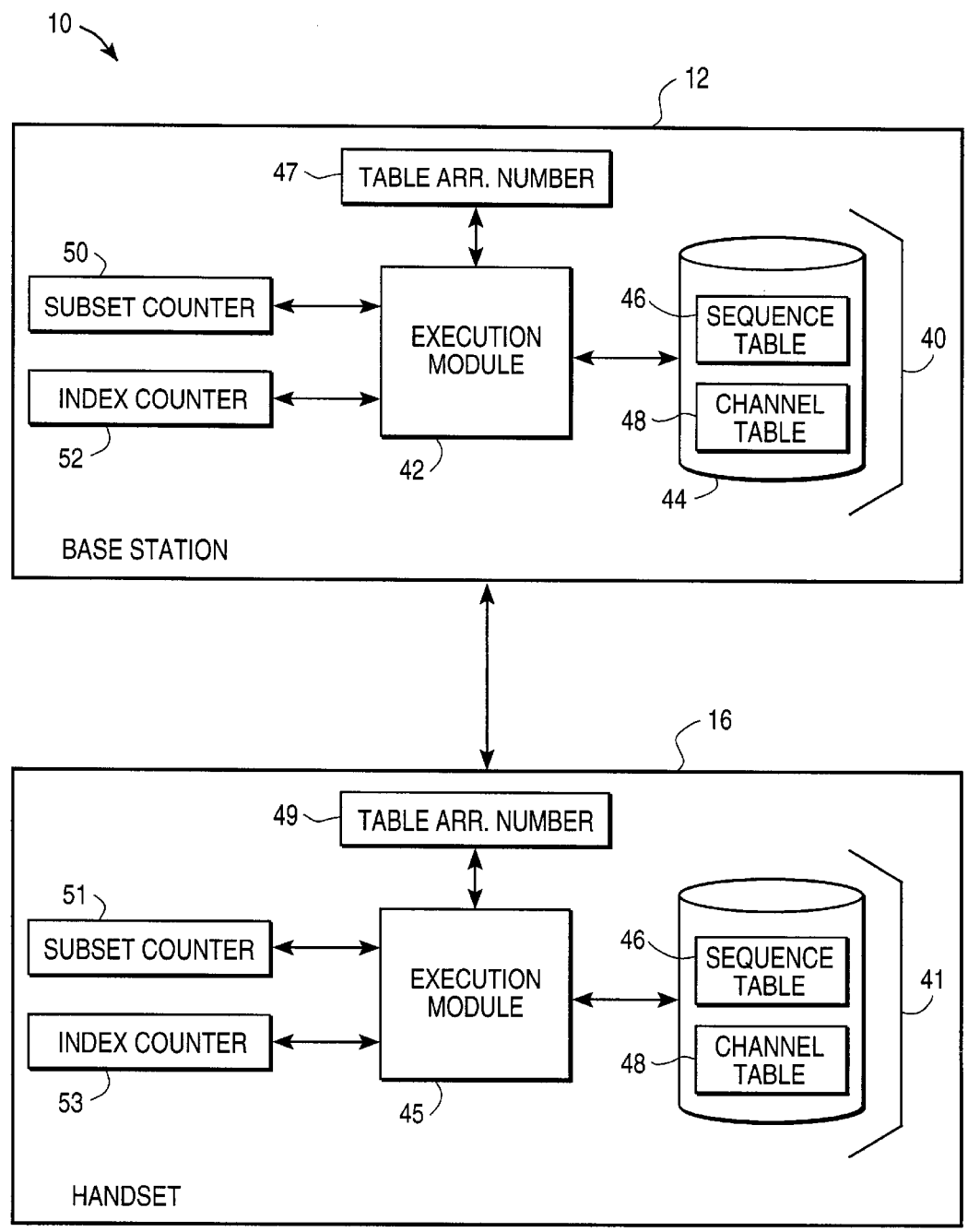
FIG. 4 is a block diagram of one embodiment of a system for table implemented frequency selection in a frequency hopping cordless telephone system.

FIG. 1 is a block diagram of one embodiment of a frequency hopping cordless telephone system, indicated generally at 10. System 10 comprises one or more base stations 12, each which can also be referred to as a fixed part (FP). Each base station 12 can support communication with a plurality of handsets 14 and handsets 16 using radio frequencies. The interface between base station 12 and handsets 14 and 16 can be referred to as the air interface. Handsets 14 and handsets 16 can also be referred to as portable parts (PP).

In operation, base station 12 can support a defined total number of handsets 14 and 16. For example, in one implementation, base station 12 can support a total of eight handsets, either idle locked or active locked. of the total number of handsets, a given number "M" can be active locked handsets 16. For example, base station 12 could support up to four active locked handsets 16 from the eight total handsets. Of the remaining handsets, base station 12 can support a given number "N" of idle locked handsets 14. For example, "N" can be less than or equal to the difference between the total number of supported handsets (e.g., 8) and the number "M" of active locked handsets 16 (e.g., 0–4). Idle locked handsets 14 are handsets that are currently inactive but are in contact with and in sync with base station 12.

Base station 12 can communicate with handsets 14 and handsets 16 using a time division multiplexed (TDM) frame-based communication protocol. For example, each frame can be ten milliseconds (10 ms) in duration and can include transmit and receive channels for communication and control data. One protocol used with digital cordless telephone systems is the Digital Enhanced Cordless Telecommunications (DECT) protocol, which is the pan-European standard for digital cordless systems and supports up to six locked handsets 16 (i.e., M=6). There are, of course, other protocols used for communicating across the air interface between base station 12 and handsets 14 and handsets 16. For example, the DECT protocol can be modified to support up to four locked handsets 16 (i.e., M=4), each with enhanced communication features due to higher data rates.

In the embodiment of FIG. 1, system 10 uses an ISM band of radio frequencies for supporting communication between base station 12 and handsets 14 and 16. For example, system 10 can use the ISM band extending from 2.4 GHz to 2.4835 GHz. An advantage of using the ISM band is that it is unlicensed and does not require a license fee for use. However, in order to operate within FCC or other government regulations, system 10 implements a frequency hopping scheme. This allows system 10 to support robust cordless communications in the ISM band while operating within regulation guidelines. Under the frequency hopping scheme, base station 12 and handsets 14 and 16 move in the time domain from frequency to frequency. Because of the changing frequency, handsets 14 and 16 are initially in an unlocked state when entering an area serviced by base station 12. Handsets 14 and 16 can then "listen" at a specific radio frequency to attempt to lock on to base station 12. When base station 12 hops to that frequency specific frequency, handsets 14 and 16 can identify and receive control data transmitted by base station 12. This allows handsets 14 and 16 to lock with base station 12 and sync with the frequency hopping scheme.

FIG. 2 is a block diagram of one embodiment of frame frequencies for a frequency hopping cordless telephone system. As shown, a frame structure, indicated generally at 20, comprises a plurality of frames 22 each having a frame length 24. Each frame 22 follows immediately after the previous frame 22 in the time domain. In the embodiment of FIG. 2, a different frequency ($F_1$, $F_2$, $F_3$ ... $F_N$, $F_{N+1}$, ... ) is associated with each frame 22 and is used during that frame 22 for communication across the air interface between base station 12 and handsets 14 and 16. This change from frequency to frequency is handled by the frequency hopping scheme implemented by base station 12 and handsets 14 and 16. During the duration of a given frame 22, base station 12 and handsets 14 and 16 communicate using the selected frequency for that frame 22. When the next frame 22 begins, base station 12 and handsets 14 and 16 communicate using a new selected frequency. In one embodiment, frame length 24 is ten milliseconds, thus the frequency being used changes every ten milliseconds.

FIG. 3 is a diagram of one embodiment of subdividing the ISM band for a frequency hopping cordless telephone system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 3, this range is divided into twelve subsets 30, and each subset 30 is divided into eight channels 32. Each channel 32 is then associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, also needs to implement a scheme for avoiding bad frequencies. For example, a PCS microwave tower may interfere with frequencies in the ISM band in a particular region. Thus, cordless telephone system 10 would not want to use those frequencies. One way to avoid such bad frequencies is to block their selection. By dividing the ISM band into ninety-six frequencies, the embodiment of FIG. 3 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

Within a cordless telephone system, a frequency hopping scheme can address a number of implementation problems. For example, the frequency hopping scheme should be consistent across base stations yet attempt to ensure that adjacent base stations do not select the same frequencies and interfere with one another. This means that the frequency selection process needs to be both predictable (so handsets can lock with any base station) and variable (so base stations operate at different frequencies). Also, the frequency hopping scheme should attempt to avoid selecting and using bad frequencies due to interference or other problems. Further, the frequency hopping scheme should react to interference by separating the frequencies selected by a base station from possible interference by other base stations.

FIG. 4 is a block diagram of one embodiment of a selection system, indicated generally at 40, for table implemented frequency selection in a frequency hopping cordless telephone system. Selection system 40 is operable to implement a frequency hopping scheme that selects a frequency for communication between a base station 12 and one or more handsets 16. In the embodiment of FIG. 4, selection system 40 resides in base station 12. A similar selection system 41 resides in handset 16. Selection systems 40 and 41 must be operable to select the same frequency for a given frame, such that base station 12 and handset 16 can continue communication while hopping frequencies.

Selection system 40 comprises an execution module 42 coupled to a storage module 44. Execution module can comprise, for example, executable software code executing on a microprocessor. Storage module 44 comprises a device operable to store digital data. For example, storage module 44 in base station 12 can comprise, among others, a read only memory (ROM) device, a read access memory (RAM) device, any derivative of ROM or RAM, or a magnetic storage device such as a hard disk drive.

Storage module 44 is operable to maintain a sequence table 46 and a channel table 48. Sequence table 46 and channel table 48 include data arranged such that execution module 42 can access the data. As discussed below, execution module 42 will use the data in sequence table 46 and channel table 48 to select a frequency for communication between base station 12 and handset 16.

Table system 40 further comprises a table arrangement number 47, a subset counter 50, and an index counter 52, each coupled to execution module 42. Table arrangement number 47 includes an unique identifier for base station 12. A unique table arrangement number 49 can assist in the implementation of a frequency hopping cordless telephone system 10 such that interference between multiple base stations 12 can be minimized. Subset counter 50 corresponds to the current subset of possible frequencies that base station 12 and handset 16 will use for communication during a single frame. Index counter 52 corresponds to the number of times a given subset is or has been used for communication during a given cycle of a frequency hopping scheme. Table arrangement number 49, subset counter 50, and index counter 52 can be implemented, for example, through the use of variables maintained by execution module 42 and implemented through executable software code.

In operation, execution module 42 first derives table arrangement number 47, subset counter 50, and index counter 52. For example, deriving table arrangement number 47 could include reading a hardware setting on base station 12. Deriving subset counter 50 and index counter 52 can include, for example, initializing two variables to zero, and then incrementing the variables as necessary. For example, one embodiment of the present invention includes twelve subsets, and thus deriving subset counter 52 could include sequencing subset counter 50 through the following sequence: 0, 2, 4, 6, 8, 10, 11, 9, 7, 5, 3, 1. In one embodiment, index counter 52 increments every Nth frame, wherein N is the total number of subsets. Thus, deriving index counter 52 could include incrementing index counter 52 each time subset counter 52 reaches "0", such that index counter sequences through the following sequence: 0, 1, 2, 4, 5, 6, 7.

Execution module 42 then uses subset counter 50 and table arrangement number 47 to select a sequence from sequence table 46. Sequence table 46 can comprise, for example, a two-dimensional array indexed on one axis by a range of possible table arrangement numbers 48 and on a second axis by a range of all possible subset counters 50. In this way, execution module 42 selects a sequence of operating frequencies that base station 12 will use each time base station 12 transmits in a given subset. As discussed above, table arrangement number can be a unique identifier assigned to base station 12. This allows execution module 12 to select a unique sequence for a given subset counter 50. This allows the cordless telephone system 10 to minimize interference between multiple base stations 12, because each base station 12 can use a different sequence when operating in the same subset.

Execution module 42 then uses the sequence derived from sequence table 46 and index counter 52 to select a channel from channel table 44. Channel table 44 can comprise, for example, a two-dimensional array indexed on one axis by a range of all possible sequence numbers and on a second axis by a range of all possible index counters 52.

Execution module 42 then uses subset counter 50 and the selected channel to derive a selected frequency for communication (see FIG. 3 for one example of a relationship between subset, channel, and frequency).

Selection system 41 residing on handset 16 operates in a similar manner. Selection system 41 is operable to select frequencies using the same hopping scheme as selection system 40, such that base station 12 and handset 16 can continue communication as they hop frequencies.

In operation, when handset 16 initially enters an area serviced by base station 12, it "listens" on one particular frequency. As base station 12 hops through frequencies, it transmits control data. At some point, base station 12 will transmit control data on the same frequency that handset 16 is listening on. The control data can include the table arrangement number 47 of base station 16.

Handset 16 can now "back out" the correct subset counter 50 and the correct index counter 52 such that it can begin to hop frequencies in a synchronized fashion as base station 12. First, execution module 45 can equate its table arrangement number 49 to the control data from base station 12 and table arrangement number 47. Execution module 45 is already aware of the frequency, channel, and subset that it was listening on. In a method similar the method used by execution module 42, execution module 45 of handset 16 can use table arrangement number 49 and the current subset to derive the proper sequence from sequence table 46.

Next, execution module 45 uses the current channel and the selected sequence to derive index counter 53 from channel table 48. Execution module 45 can then synchronize its index counter 53 to index counter 52 of base station 12. Execution module 45 is now operable to select frequencies in a synchronized fashion as execution module 42. Of course, in order to perform this functionality, execution module 45 must also know the correct sequence to increment subset counter 51. Additionally, sequence tables 46 and channel tables 48 on base station 12 and handset 16 must comprise equivalent data.

Figure 5:
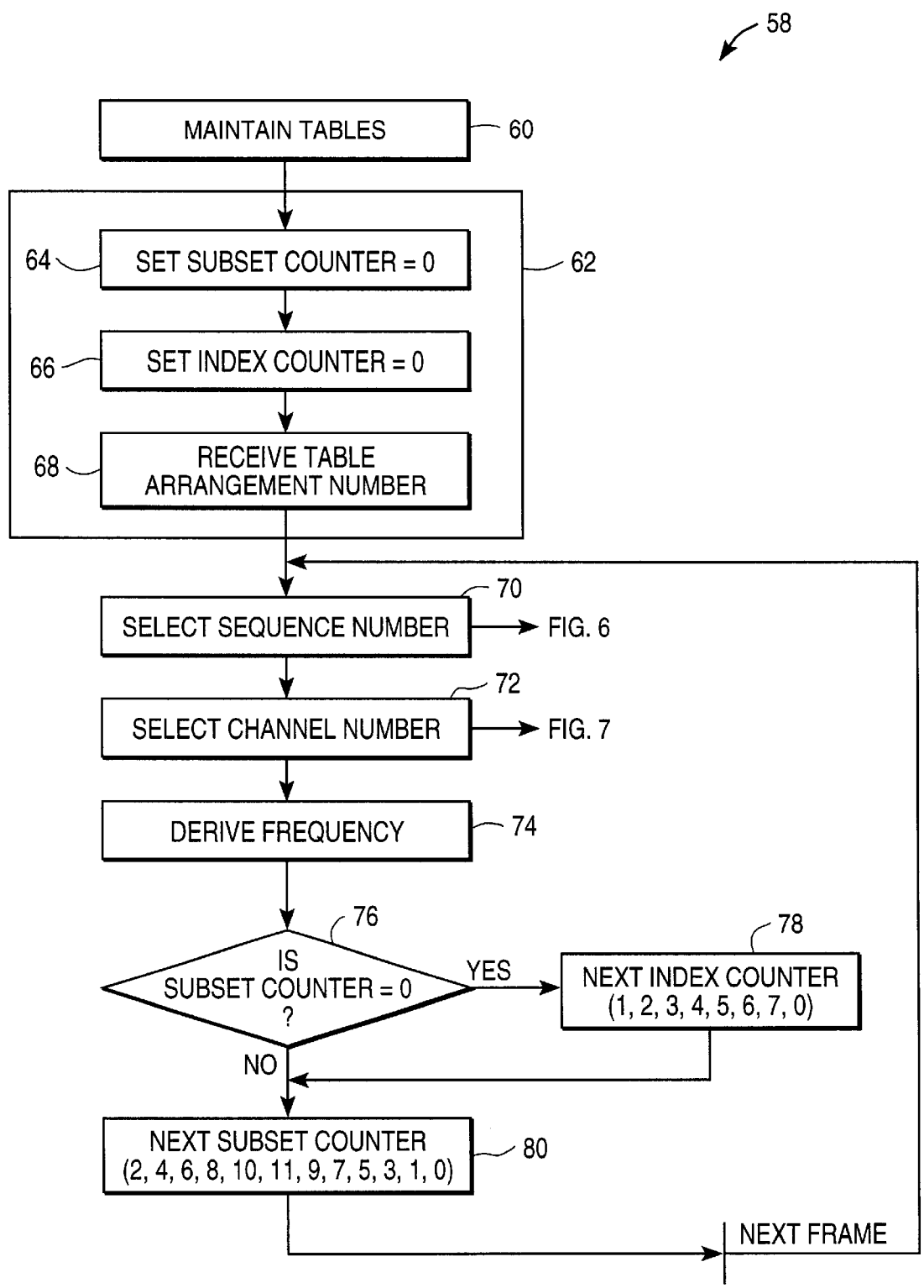
FIG. 5 is a flow diagram of one embodiment of a method for table implemented frequency selection in a frequency hopping cordless telephone system.

FIG. 5 is a flow diagram of one embodiment of a method indicated generally, at 58, for table implemented frequency selection in a digital cordless telephone system. Method 58 can be implemented, for example, by execution module 42 in conjunction with storage module 44 of FIG. 4.

At step 60, a sequence table and a channel table are maintained. Such tables can comprise, for example, the two dimensional tables as illustrated in FIGS. 6 and 7, discussed below. At step 62, a subset counter, an index counter, and a table arrangement number are derived. In the embodiment of FIG. 5, deriving the subset counter initially comprises setting the subset counter to zero at step 64. Likewise, deriving the index counter comprises initially setting the index counter to zero at step 66. At step 68, the table arrangement number is derived by receiving such a table arrangement number. Such a step could include, for example, reading hardware settings that a user can uniquely assign to a base station.

At step 70, a sequence number is selected. Such a selection could be made, for example, by referencing the sequence number table of FIG. 6. The sequence number is selected using the table arrangement number and the subset counter. Next, at step 72, a channel number is selected. Such a selection could comprise, for example, referencing the table as shown in FIG. 7. The channel is selected by referencing FIG. 7 knowing the sequence number selected at step 70 and the index counter.

At step 74, the selected frequency is derived. The selected frequency is the frequency at which the base station 12 and handset 16 (FIG. 4) will communicate during a given frame. The selected frequency is a function of the current subset and the channel number selected in step 72. For example, using the frequency, channel, and subset divisions of FIG. 3, there are 96 possible frequencies to be selected in the range of 2.4 GHz to 2.4835 GHz. These 96 possible frequencies are grouped into twelve subsets, numbered 0 through 11, and each subset includes eight channels, numbered 0 through 7. Therefore, in this example, if the subset and the channel are known, the frequency can be derived by the following equation:

$$\text{frequency} = [(\subset *8) + \text{channel number} *(2.4835-2.4)/96 + 2.4] \text{GHz}.$$

Steps 76, 78 and 80 are continuations of the derivation step 62. At step 74, it is determined if the subset counter is equal to zero. If the subset counter is equal to zero, at step 78 the index counter is incremented. In the embodiment of FIG. 5, incrementing the index counter comprises repeating the following sequence: 1, 2, 3, 4, 5, 6, 7, 0. If the subset counter at step 76 is not equal to zero, then the method proceeds directly to step 80. At step 80, the subset counter is incremented. In the method of the current embodiment, incrementing the subset counter comprises repeating the following sequence: 2, 4, 6, 8, 10, 11, 9, 7, 5, 3, 1, 0. As indicated above, the subset counter corresponds to the subset at which communications will take place during the frame. The index counter can count the number of times the system communicates on a given subset.

After step 80, the method proceeds back step 70 to repeat the steps for selecting a new frequency. As indicated in FIG. 5, this selection process is performed for the next frame.

FIG. 6 is a diagram of one embodiment of a sequence table, indicated generally at 46, as used in the method of FIG. 5. Sequence table 46 includes an array 82 of sequence numbers. In the embodiment of FIG. 5, array 82 comprises a two dimensional array that is indexed on a first axis by a table arrangement number 84 and on a second axis by a subset number 88.

In operation, a particular sequence can be determined and used to derive a selected frequency for use in communication between the base module and the handset. For example, as used in step 70 of FIG. 5, given a table arrangement number 84 and a subset 88 a sequence 80 can be selected.

An example of the operation of the sequence number may be illustrative. For example, assume a base station with the unique table arrangement number of "8". Further assume that for a given frame the base station has determined (i.e., by incrementing a subset counter) that it will transmit in the range of frequencies that correspond to subset "4." Referring to sequence table 46, such parameters will lead to a selection of sequence "12". Sequence "12" specifies the order in which channels of subset 4 will be used by base station 8. This sequence will be used in conjunction with an index number, as described in the method of FIG. 5, to determine the selected frequency for a given frame.

FIG. 7 is a diagram of one embodiment of a channel number table, indicated generally at 48, as used in the method of FIG. 5. Channel number table 48 comprises a two dimensional array 92 of channel numbers. The array 92 of channel numbers is indexed on a first axis by sequence numbers 94 and on a second axis by index numbers 96.

In the embodiment of FIG. 7, there are twelve sequence numbers 94 (1 through 12) and eight index numbers 96 (0 through 7). Sequence numbers 94 correspond to the array 82 of sequence numbers of the sequence table 46 (FIG. 6). Index numbers 96 correspond to the index counter as described in the method of FIG. 5.

In operation, using the sequence number 94 and the index number 96, a channel number 92 can be selected. For example, continuing the illustration as discussed with respect to FIG. 6, it has been derived that the sequence number is "12." Further assume that the index number is "2" (or this is the third time that this subset has been used). Such parameters lead to the selection of channel "5."

It can be seen that the correct operating frequency upon which the base station and handset will communicate can now be derived, as discussed with respect to the method of FIG. 5. Namely, the operating frequency is derived from the subset and channel.

Although the present invention has been described in detail, it should be understood that various changes, substitutions and alterations can be made thereto without departing from the spirit and scope of the invention as defined by the appended claims.

What is claimed is:

1. A method for table implemented frequency selection in a cordless telephone system, the method comprising:

maintaining a first table comprising an array of sequence numbers;

maintaining a second table comprising an array of channel numbers;

selecting a sequence number from the first table by using a table arrangement number and a subset counter;

selecting a channel number from the second table using the sequence number and an index counter; and deriving a selected frequency from the channel number and the subset counter.

2. The method of claim 1, further comprising deriving the table arrangement number unique to a base station used in a cordless telephone system.

3. The method of claim 1, further comprising deriving the subset counter such that the subset counter corresponds to a frequency subset for transmission in a cordless telephone system.

4. The method of claim 1, further comprising deriving an index counter.

5. The method of claim 1, further comprising incrementing the subset counter every frame.

6. The method of claim 5, wherein incrementing the subset counter comprises repeating the following sequence: 0, 2, 4, 6, 8, 10, 11, 9, 7, 5, 3, 1.

7. The method of claim 1, further comprising incrementing the index count every Nth frame, wherein N is a total number of possible frequency subsets.

8. The method of claim 7, wherein incrementing the index counter comprises repeating the following sequence: 0, 1, 2, 3, 4, 5, 6, 7.

9. The method of claim 8, further comprising incrementing the index counter each time the subset counter reaches 0.

10. The method of claim 1, wherein the selected frequency comprises a frequency in a range of 2.4 GHz to 2.4835 GHz.

11. The method of claim 1, wherein the first table comprises a two-dimensional array of sequence numbers indexed by a first axis and a second axis.

12. The method of claim 11, wherein the first axis comprises a range of table arrangement numbers.

13. The method of claim 11, wherein the second axis comprises a range of subset numbers.

14. The method of claim 1, wherein the second table comprises a two-dimensional array of channel numbers indexed by a first axis and a second axis.

15. The method of claim 14, wherein the first axis comprises a range of sequence numbers.

16. The method of claim 14, wherein the second axis comprises a range of index numbers.

17. The method of claim 1, wherein the subset counter represents one of plurality of frequency subsets, and wherein each frequency subset comprises a plurality of channels, and further wherein each channel represents a frequency.

18. The method of claim 17, wherein the plurality of frequency subsets comprises 12 frequency subsets.

19. The method of claim 17, wherein each frequency subset comprises 8 channels.

20. A system for table implemented frequency selection in a cordless telephone system, the system comprising:
a data storage module for maintaining a first table comprising an array of sequence numbers, and a second table comprising an array of channel numbers; and
an execution module coupled to the data storage module and, the execution module operable to:
select a sequence number from the first table by using a table arrangement number and a subset counter;
select a channel number from the second table using the sequence number and an index counter; and
derive a selected frequency from the channel number and the subset counter.

21. The system of claim 20, wherein the execution module is further operable to derive the table arrangement number unique to a base station used in a cordless telephone system.

22. The system of claim 20, wherein the execution module is further operable to derive the subset counter such that the subset counter corresponds to a frequency subset for transmission in a cordless telephone system.

23. The system of claim 20, wherein the execution module is further operable to derive an index counter.

24. The system of claim 20, wherein the execution module increments the subset counter every frame.

25. The system of claim 24, wherein the execution module increments the subset counter by repeating the following sequence: 0, 2, 4, 6, 8, 10, 11, 9, 7, 5, 3, 1.

26. The system of claim 20, wherein the execution module increments the index counter every Nth frame, wherein N is a total number of possible frequency subsets.

27. The system of claim 26, wherein the execution module increments the index counter by repeating the following sequence: 0, 1, 2, 3, 4, 5, 6, 7.

28. The system of claim 27, wherein the execution module increments the index counter each time the subset counter reaches 0.

29. The system of claim 20, wherein the selected frequency comprises a freque in a range of 2.4 GHz to 2.4835 GHz.

30. The system of claim 20, wherein the first table comprises a two-dimensional array of sequence numbers indexed by a first axis and a second axis.

31. The system of claim 30, wherein the first axis comprises a range of table arrangement numbers.

32. The system of claim 30, wherein the second axis comprises a range of subset numbers.

33. The system of claim 20, wherein the second table comprises a two-dimensional array of channel numbers indexed by a first axis and a second axis.

34. The system of claim 33, wherein the first axis comprises a range of sequence numbers.

35. The system of claim 33, wherein the second axis comprises a range of index numbers.

36. The system of claim 20, wherein the subset counter represents one of a plurality of frequency subsets, and wherein each frequency subset comprises a plurality of channels, and further wherein each channel represents a frequency.

37. The system of claim 36, wherein the plurality of frequency subsets comprises 12 frequency subsets.

38. The system of claim 36, wherein each frequency subset comprises 8 channels.

39. A method for table implemented frequency selection in a digital cordless telephone system, the method comprising:
maintaining a first table comprising a two dimensional array of sequence numbers, wherein the array is indexed on a first axis by a range of table arrangement numbers and on a second axis by a range of subset numbers;
maintaining a second table comprising a two dimensional array of channel numbers, wherein the array is indexed on a first axis by a range of sequence numbers and on a second axis by a range of index numbers;
deriving a table arrangement number, a subset counter, and an index counter;
selecting a sequence number from the first table by using the table arrangement number and the subset counter;
selecting a channel number from the second table using the sequence number and the index counter; and
deriving a selected frequency from the channel number and the subset counter.

40. The method of claim 39, further comprising incrementing the subset count every frame.

41. The method of claim 40, wherein incrementing the subset counter comprises repeating the following sequence: 0, 2, 4, 6, 8, 10, 11, 9, 7, 5, 3, 1.

42. The method of claim 39, further comprising incrementing the index counter every Nth frame, wherein N is a total number of possible frequency subsets.

43. The method of claim 42, wherein incrementing the index counter comprises repeating the following sequence: 0, 1, 2, 3, 4, 5, 6, 7.

44. The method of claim 43, further comprising incrementing the index counter each time the subset counter reaches 0.

45. The method of claim 39, wherein the selected frequency comprises a frequency in a range of 2.4 GHz to 2.4835 GHz.

46. The method of claim 39, wherein the range of table arrangement numbers comprises 16 table arrangement numbers.

47. The method of claim 39, wherein the range of subset numbers comprises 12 subset numbers.

48. The method of claim 39, wherein the range of table sequence numbers comprises 12 sequence numbers.

49. The method of claim 39, wherein the range of index numbers comprises 8 index numbers.

50. The method of claim 39, wherein the subset counter represents one of a plurality of frequency subsets, and wherein each frequency subset comprises a plurality of channels, and further wherein each channel represents a frequency.

51. The method of claim 50, wherein the plurality of frequency subsets comprises 12 frequency subsets.

52. The method of claim 50, wherein each frequency subset comprises 8 channels.

* * * * *